May 13, 1958 O. KLINKENBERG 2,834,374
SAFETY RELIEF VALVE
Filed June 16, 1955
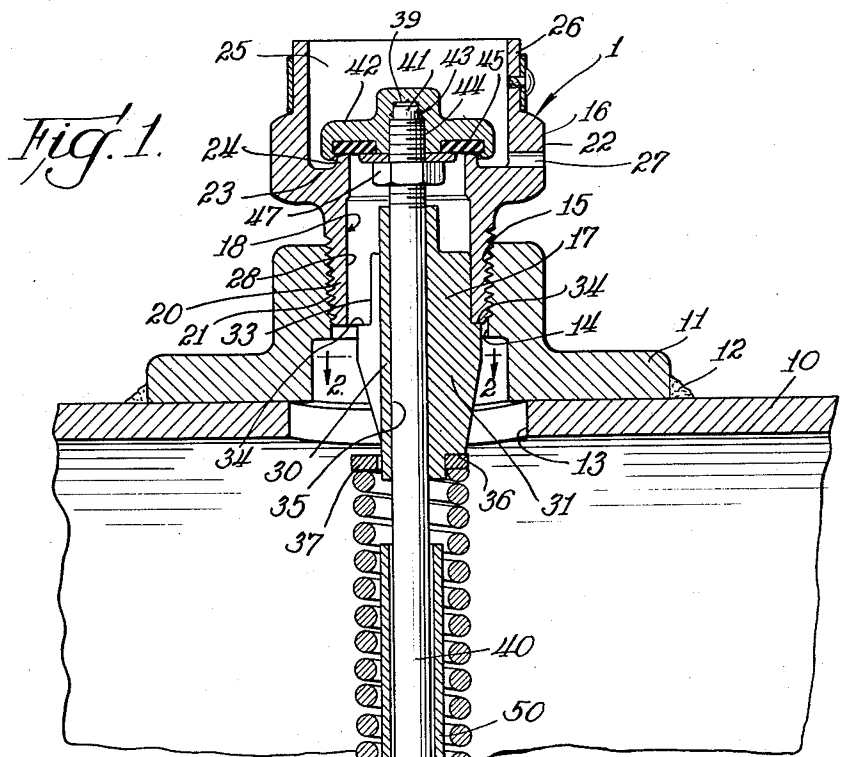
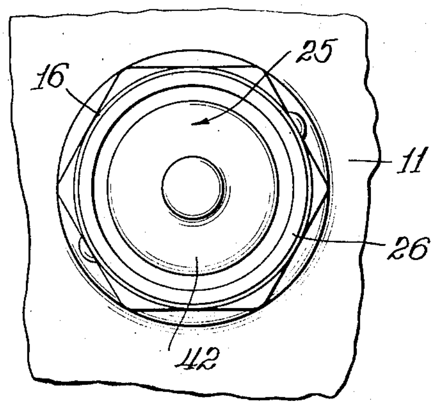
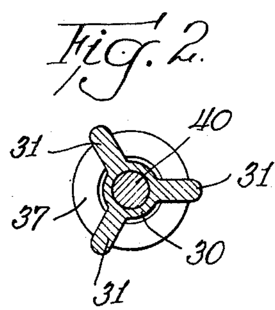
INVENTOR.
Otto Klinkenberg
BY
Watson D. Harbaugh
Atty.

United States Patent Office 2,834,374
Patented May 13, 1958

1

2,834,374

SAFETY RELIEF VALVE

Otto Klinkenberg, Winnetka, Ill., assignor to The Bastian-Blessing Company, Chicago, Ill., a corporation of Illinois Application June 16, 1955, Serial No. 515,829
3 Claims. (Cl. 137—541)

The present invention relates to recessed pop off pressure relief valves of a type generally employed in the handling and storage of liquefied petroleum gas in pressure containers.

In providing pressure safety relief for pressure containers storing liquefied petroleum gas, it is highly desirable to have a pressure relief valve whose opening and closing characteristics with respect to pressures are constant and comparatively close together and whose structure is rugged and arranged to withstand abuse in the field without failure.

Liquefied petroleum gas being highly volatile and highly flammable, a pressure relief valve should be open no longer than necessary to reduce the pressure appreciably and then close again, and repeating this at short intervals rather than having discharges of long duration. In the event the pressure in the tank is due to some source of extreme heat in its environment which might ignite the relieved gas, the resulting rapid opening and closing of the safety valve will keep the pressure of the tank at the safety level and snuff out any ignition of the gas which might occur at rapid intervals to help eliminate the dangers of starting secondary fires which might occur with an ignited long blowoff of the gas experienced with conventional safety relief valves. In order to provide a valve having a limited range of opening and closing pressures, it is necessary that a long spring be employed. The longer the spring, the less the pressure differential for a given opening distance of the valve. However, the use of long springs is confronted with space difficulties and the spring tends to buckle and bend when placed under compression causing a cocking of the valve stem and partial tilting of the valve member itself. Moreover, a long spring which is permitted to buckle causes frictional contacts between relatively movable parts which tend to interfere with the crisp action of the valve.

One of the objects of the present invention is to provide a recessed pop-off valve having close opening and closing pressures with minimum cocking of the valve stem or misalignment between associated valve parts.

A further object of the invention is to provide a rugged guide relationship within the confines of a storage tank with wide clearances between relative moving parts exterior of the tank so that dents and blows to external parts will not cause binding or interference between relative moving parts.

The invention is further characterized by long guideways between cooperating elements, high volume flow areas and constant performance.

The valve is easy and inexpensive to machine, assemble, and install; readily adjustable and rugged in maintaining adjustment.

These being among the objects of the invention other and further objects will become apparent from the drawing, the appended claims and the description relating thereto.

In the drawings:

Fig. 1 is an elevational view, in section, showing a valve made in accordance with the present invention;

Fig. 2 is a horizontal sectional view taken substantially on line 2—2 of Fig. 1; and Fig. 3 is a plan view of the valve of Fig. 1.

2

Referring now to the drawing in further detail, a wall portion 10 of a conventional pressure storage tank is shown in Fig. 1 as provided with a flange coupling 11 welded thereto as at 12. The flange covers an opening 13 and has an opening 14 concentric therewith threaded as at 15 to receive the valve therein which will now be described.

The valve housing is made up of two parts, a main housing 16 and a guide member 17. The main housing has a passage 18 therethrough terminating at the lower end in a bore 20. The housing 16 is provided at this end with external threads 21 to mate in sealed relationship with the thread 15 on the flange. It will be noted that the guide relationship provided is between elements located where they are well protected from harm.

Above the threads 21 the housing 16 is enlarged as at 22 to form a wrenching configuration. The passage 18 is widened within the enlarged portion to provide an upwardly facing shoulder 23 with a valve seat 24 thereon, and an enlarged valve chamber 25 surrounded with a circular wall 26 having a drain hole 27 therethrough to keep the chamber 25 dry.

The lower end of the passage 18 is machined to form a bore 28 concentric with the valve seat 24 and slidably receives the guide member 17 therein with a snug fit. The guide member is formed of a core portion 30 having three equally spaced radially extending ribs 31 turned down at their upper ends to define a cylindrical surface as at 33 to be received within the bore 28 and rest against the lower extremity of the housing at shoulders 34. A bore 35 forms a guideway through the core portion 30 and is machined concentrically with the bore 28 in the main housing. At their upper end the ribs 31 terminate short of the upper end of the core portion 30 and at their lower end terminate in a shoulder 36 against which a washer 37 rests in square relationship with the axis of the guideway 35.

With the rugged guide relationship thus provided for the valve where it is safe from harm, this eliminates the use of guide ribs on the valve member located within the valve chamber 25. Thus wide clearances are provided at this point between the valve member and housing so that dents or deformations short of destruction will not cause interference with free movement between the valve member and valve housing.

For purposes of so mounting a valve member, a rod 40 is threaded at both ends to provide a stem at the upper end of which, beyond the thread, is relieved to a cylindrical end 41 terminating in a flat end wall 39. On this upper end a retainer assembly is mounted comprising a valve member or retainer 42 having a bore 43 threaded at 44 to mate with the upper end of the stem 40 and bottomed to make-up in rigidly squared relationship with the flat end wall 39; a valve disk 45 carried by the retainer; a washer 46; and, a lock nut 47.

Mounted in surrounding relation to the lower end of the stem 40 is an elongated helical compression spring 51. This spring is desirably of a length to have sufficient convolutions that a limited range of opening and closing pressure is obtained. By this arrangement, a rapid succession of openings of the valve is afforded, and the puffs of gas emitted are capable of snuffing out a fire in the immediate vicinity of the container. In addition, since the duration of the valve opening is limited, ignition of the container contents is precluded. The stem 40 passes through the guideway 35 of the guide member 17 the shoulder 34 of which is urged into abutment with the lower edge of the housing 16 by the spring 51. Between the upper convolution of the spring 51 and the lower edge of the guide member 17 is interposed a washer 37. To assure proper alignment of the washer 37, and consequently the spring 51, with respect to the stem 40, the guide member 17 is recessed as at 36 and the washer 37 is received in this recess. The spring 51 is retained in position by a retainer washer 52 adjustably maintained in position by a lock nut 53 which may be locked in position by a roll pin 54 passing through the shank at the lower end of the stem 40. A predetermined compression is placed on the spring 51, by tightening the lock nut 53 normally to urge the disk 45 of the retainer assembly into contact with the seat 24.

According to an important feature of the present invention means are provided for preventing cocking or lateral deflection of the spring 51 and consequent binding of the stem 40 within the guideway 35, and for limiting the upward movement of the retainer assembly. In this instance, this means takes the form of an elongated sleeve 50 disposed between the stem 40 and the spring 51. The length of the sleeve 50 is dimensioned to be just short of the distance between the resting position of the spring retainer washer 52 and the lower end of the guide member 17 or slightly less than the normal length of said spring. By this arrangement the length of the sleeve determines the open limit of the valve. Otherwise the sleeve is loose upon the stem to approach the inside diameter of the spring and keep the spring straight so that there will be no cocking or binding of the spring with the sleeve of any appreciable lateral force upon the sleeve.

The long guide contact between the guide member 17 and the stem maintains free moving contact between the elements even though possible defects in the squareness of the spring ends might tend to cock the stem under other circumstances. Moreover the retainer 42 need not be guided along the inside of the wall of the upper body 25. Wide clearances are provided over this area for full flow of relieved gas and inadvertent denting of the side wall will not interfere with the opening or closing of the valve.

Moreover, it will be apparent to those skilled in the art how the objects mentioned are attained and the difficulties overcome, and how various changes or modifications can be made therein without departing from the spirit of the invention, the scope of which is commensurate with the appended claims.

What is claimed is:

1. A safety valve characterized by a limited range of opening and closing pressures comprising a housing adapted to be mounted in a threaded coupling defining an opening in a wall of a container, said housing having a passage therethrough including a bore at one end, an elongated web-like guide member received in said bore, said guide member having a shoulder engaging the lower end of said housing, said guide member having an axial bore, a stem slidably mounted in the bore of said guide member, an elongated helical spring disposed in surrounding relation to said stem, said spring being subject to lateral deflection when compressed by upward movement of said stem, said housing being formed with an annular valve seat surrounding said passage, a retainer assembly including a valve secured to the upper end of said stem, a retainer washer mounted on the lower end of said stem and in abutting relation with said spring, said spring being confined under a predetermined compression between said washer and said guide member whereby the spring normally urges the valve into contact with said seat, and an elongated sleeve disposed between and in closely adjacent relation to both said stem and said spring to prevent lateral deflection of said spring and consequent binding of the stem in the bore of said guide member, said sleeve having a length slightly less than the length of said spring when the valve is closed, and the upper end of said sleeve abutting said guide member to limit the upward movement of said stem when said valve is in its fully open position.

2. A safety valve characterized by a limited range of opening and closing pressures comprising a housing adapted to be mounted in a coupling defining an opening in a wall of a container, said housing having a passage therethrough including a bore at its lower end, an elongated web-like guide member received in said bore, said guide member including a core having an axial bore and a plurality of circumferentially spaced ribs in engagement with the cylindrical wall defining said housing bore, a stem slidably mounted in the bore of said guide member, an elongated helical spring disposed in surrounding relation to said stem and operative to retain said guide member in said housing bore, said spring being subject to lateral deflection when compressed by upward movement of said stem, said housing being formed with an annular valve seat surrounding said passage, a retainer assembly including a valve secured to the upper end of said stem, a retainer washer mounted on the lower end of said stem and in abutting relation with said spring, said spring being confined under a predetermined compression between said washer and said guide member whereby the spring normally urges the valve into contact with said seat, means for adjusting the compression of said spring to vary the opening pressure, and an elongated sleeve disposed between and in closely adjacent relation to both said stem and said spring to prevent lateral deflection of said spring and consequent binding of the stem in the bore of the guide member, said sleeve having a length slightly less than the length of said spring when the valve is closed, and the upper end of said sleeve abutting said guide member to limit the upward movement of said stem when said valve is in its fully open position.

3. A safety valve characterized by a limited range of opening and closing pressures comprising a housing portion adapted to be mounted in a threaded coupling defining an opening in a wall of a container, said housing having a downward opening passage therethrough including a bore at one end, axially elongated web-like guide members disposed radially in said passage, said guide members extending below the lower end of said housing and having integral with their inner edges a guide element having an axial bore therethrough and terminating at a predetermined distance below said passage, a stem slidably mounted in the bore of said guide element, an elongated helical spring disposed in surrounding relation to said stem, said spring being subject to lateral deflection when compressed by upward movement of said stem, said housing portion being formed with an annular valve seat surrounding said bore, a retainer assembly including a valve secured to the upper end of said stem, a retainer washer mounted on the lower end of said stem and in abutting relation with said spring, said spring being confined under a predetermined compression between said washer and said guide member whereby the spring normally urges the valve into contact with said seat, and an elongated sleeve disposed between and in closely adjacent relation to both said stem and said spring to prevent lateral deflection of said spring and consequent binding of the stem in the bore of said guide member, said sleeve having a length slightly less than the length of said spring when the valve is closed, and the upper end of said sleeve abutting said guide element to limit the upward movement of said stem when said valve is in its fully open position.

References Cited in the file of this patent

UNITED STATES PATENTS

| | | |
|---|---|---|
| 308,479 | Falk | Nov. 25, 1884 |
| 409,553 | Beckmann | Aug. 20, 1889 |
| 422,385 | Dennedy | Mar. 4, 1890 |
| 762,078 | Morgan | June 7, 1904 |
| 2,608,210 | St. Clair | Aug. 26, 1952 |

FOREIGN PATENTS

| | | |
|---|---|---|
| 3,456 | Great Britain | of 1875 |